(12) United States Patent
Gindele

(10) Patent No.: US 8,463,650 B2
(45) Date of Patent: Jun. 11, 2013

(54) SYSTEMS AND METHODS TO INITIATE PAYMENTS FROM ELECTRONIC DEVICES

(75) Inventor: Gabe B. Gindele, Wilmington, DE (US)

(73) Assignee: Barclays Bank Delaware, Wilmington, DE (US)

( * ) Notice: Subject to any disclaimer, the term of this patent is extended or adjusted under 35 U.S.C. 154(b) by 196 days.

(21) Appl. No.: 12/718,337

(22) Filed: Mar. 5, 2010

(65) Prior Publication Data

US 2010/0228639 A1 Sep. 9, 2010

Related U.S. Application Data

(60) Provisional application No. 61/157,697, filed on Mar. 5, 2009.

(51) Int. Cl.
  *G06G 1/12* (2006.01)
  *G06Q 20/00* (2012.01)

(52) U.S. Cl.
  USPC .......................................................... 705/21

(58) Field of Classification Search
  USPC .......................................................... 705/21
  See application file for complete search history.

(56) References Cited

U.S. PATENT DOCUMENTS

| | | | |
|---|---|---|---|
| 2002/0025796 A1* | 2/2002 | Taylor et al. ................... | 455/406 |
| 2002/0026575 A1* | 2/2002 | Wheeler et al. ................ | 713/156 |
| 2002/0029342 A1* | 3/2002 | Keech ............................ | 713/184 |
| 2002/0060246 A1* | 5/2002 | Gobburu et al. ......... | 235/462.46 |
| 2002/0111886 A1* | 8/2002 | Chenevich et al. ............. | 705/30 |
| 2003/0120608 A1* | 6/2003 | Pereyra ............................ | 705/64 |
| 2003/0154139 A1* | 8/2003 | Woo ................................ | 705/26 |
| 2003/0158782 A1* | 8/2003 | Thomson et al. ............... | 705/17 |
| 2004/0019564 A1* | 1/2004 | Goldthwaite et al. .......... | 705/44 |
| 2004/0030641 A1* | 2/2004 | Hasumi et al. ................. | 705/39 |
| 2005/0278188 A1* | 12/2005 | Thomson et al. ................. | 705/1 |
| 2006/0006226 A1* | 1/2006 | Fitzgerald et al. ............ | 235/380 |
| 2006/0144925 A1* | 7/2006 | Jones ........................... | 235/380 |
| 2006/0173781 A1* | 8/2006 | Donner ........................... | 705/50 |
| 2006/0217996 A1* | 9/2006 | Graves ............................. | 705/1 |
| 2006/0294025 A1* | 12/2006 | Mengerink ...................... | 705/77 |
| 2007/0078723 A1* | 4/2007 | Downes et al. ................. | 705/26 |
| 2007/0106564 A1* | 5/2007 | Matotek et al. ................. | 705/26 |
| 2008/0048025 A1* | 2/2008 | Fitzgerald et al. ............ | 235/380 |
| 2008/0208681 A1* | 8/2008 | Hammad et al. ................ | 705/13 |
| 2008/0270301 A1* | 10/2008 | Jones et al. ..................... | 705/41 |
| 2009/0024525 A1* | 1/2009 | Blumer et al. .................. | 705/41 |
| 2009/0094123 A1* | 4/2009 | Killian et al. ................... | 705/16 |
| 2009/0132273 A1* | 5/2009 | Boesch ............................. | 705/1 |
| 2009/0271278 A1* | 10/2009 | Bishop et al. ................... | 705/21 |

* cited by examiner

*Primary Examiner* — Seye Iwarere
(74) *Attorney, Agent, or Firm* — Condo Roccia LLP

(57) ABSTRACT

Disclosed are systems and methods to initiate electronic payments using wireless network broadcasts. For example, a purchaser may purchase goods and/or services offered by a merchant by checking out (initiating a payment transaction for the goods and/or services) via a cash register or a point of sale terminal at the merchant. When a purchase amount or total for a particular purchase is calculated, a payment request message may be broadcasted publicly on a wireless network where the merchant and an electronic device operated by the purchaser may participate as network nodes. The electronic device may receive the broadcasted payment request message and may display an interface or visual indication that includes information associated with the payment request message such that the purchaser interact with the interface or visual indication to initiate a payment transaction to purchase the goods and/or services associated with the particular purchase.

20 Claims, 4 Drawing Sheets

SYSTEMS AND METHODS TO INITIATE PAYMENTS FROM ELECTRONIC DEVICES

CROSS-REFERENCE TO RELATED APPLICATIONS

This application claims benefit under 35 U.S.C. §119(e) of U.S. Provisional Patent Application No. 61/157,697, filed on Mar. 5, 2009, the disclosure of which is incorporated herein by reference.

BACKGROUND

When shopping at a merchant such as a retail store, a customer typically supplies a payment instrument such as a credit card, a debit card, cash, or a check to a cashier operating a cash register at the merchant, or interacts with a keypad to purchase goods and/or services. The cashier may then initiate a payment transaction using the payment instrument by, for example, swiping the payment instrument using a magnetic swiping device. Alternatively, the customer may initiate the payment transaction by, for example, swiping the payment transaction using a magnetic swiping device. The customer may also initiate the payment transaction by establishing a trusted communication between the payment instrument and a reader device. For example, the payment instrument may include a Radio-Frequency Identification (RFID) tag embedded therein. The customer may place the payment instrument having the RFID tag within a suitable proximity to an RFID reader device to establish the trusted communication and initiate a payment transaction using the payment instrument. Unfortunately, to initiate such payment transactions, a predetermined configuration for the trusted communication between the payment instrument and the reader device may have to be established.

SUMMARY

Disclosed herein are systems and methods for initiating a payment using an electronic device in communication with a wireless network. According to an example embodiment, a purchaser may purchase goods and/or services offered by a merchant by checking out (initiating a payment transaction for the goods and/or services) via a cash register or a point of sale terminal at the merchant. When a purchase amount or total for a particular purchase is calculated, a payment request message may be broadcasted publicly on a wireless network where the merchant and an electronic device operated by the purchaser may participate as network nodes. The payment request message may include purchase information such as a purchase amount, an identifier or description of the goods and/or services being purchased, a point of sale terminal or cash register identifier, a ticket or bill identifier, or the like that may be publicly broadcasted on the wireless network, additional system configuration information to configure operations over the wireless network, or the like. The merchant and the electronic device may be connected to the wireless network without network addresses associated with the electronic device and components of the merchant being previously configured with the wireless network.

The purchaser may receive the payment request message via, for example, the electronic device. The electronic device may display an interface or visual indication that includes information associated with the payment request message. The purchaser may view the information associated with the payment request message via the interface or visual indication to determine whether an order associated with the payment request message may be applicable to the goods and/or services the purchaser may have purchased. If the order corresponds to an order placed by the purchaser, the purchaser may then interact with the interface or visual indication to initiate a payment transaction to purchase the goods and/or services associated with the order. Information associated with the payment transaction may be received by a point of sale terminal or a cash register such that the information may be provided to a payment processor for the settlement of funds. A confirmation such as an electronic receipt may be provided to the purchaser via the electronic device.

DETAILED DESCRIPTION OF ILLUSTRATIVE EMBODIMENTS

Figure 1:
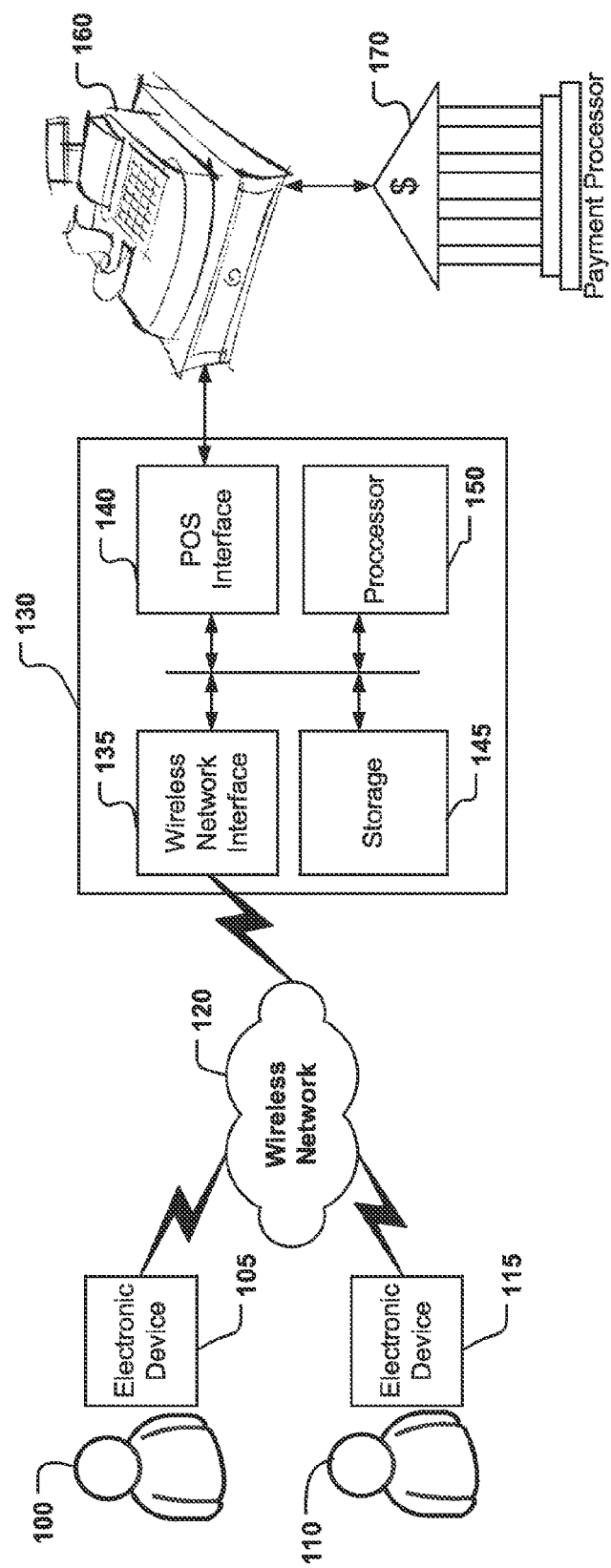
FIG. 1 is a functional block diagram of an example embodiment of a wireless payment system.

FIG. 1 is a functional block diagram of an example embodiment of a wireless payment system 130. The wireless payment system 130 may be in communication with first and second electronic devices 105, 115 that may be operated by respective first and second purchasers 100, 110. As shown in FIG. 1, the wireless payment system 130 may be in communication with the first and second electronic devices 105, 115 via a wireless network 120. For example, the first and second electronic devices 105, 115 may be connected to the wireless network 120 such that the first and second electronic devices 105, 115 may operate as nodes on the wireless network 120. The wireless network 120 may be a public wireless network such as a WiFi network, a WLAN network, or any other wireless network that may be operated by, for example, a network provider such as an internet service provider, a merchant that may provide goods and/or services, or any other suitable operating entity. The first and second electronic devices 105, 115 may be automatically connected to the wireless network 120 when the first and second electronic devices 105, 115 are within the operating frequency of the wireless network 120.

The first and second electronic devices 105, 115 may include hardware components such as a processor, a display device, an input component such as a keypad or a graphics card, a storage component, a memory component, an antenna, a communication port, or any other suitable hardware component. The first and second electronic devices 105, 115 may also include software components such as an operating system, application programs, wireless networking applications, or the like that may control the hardware components. The first and second electronic devices 105, 115 may be a cellular telephone, a Personal Data Assistant (PDA), a multimedia player such as an MP3 player, a portable computing device, or the like.

The first and second purchasers 100, 110 may be customers of a merchant such as a retail store, gas station, or the like. For example, the first and second purchasers 100, 110 may purchase goods and/or services from the merchant. The first and second purchasers 100, 110 may interact with the respective first and second electronic devices 105, 115 to initiate a payment transaction with the wireless payment system 130 to purchase good and/or services from the merchant.

The wireless payment system 130 may include hardware components such as a processor, a graphics card, a storage component, a memory component, an antenna, a communication port, or the like. The wireless payment system 130 may also include software components such as an operating system, application programs, wireless networking applications, or the like that may control the hardware components.

For example, as shown in FIG. 1, the wireless payment system 130 may include a processor 150, a storage component 145, a point of sale interface 140, and a wireless network interface 135. The processor 150, the storage component 145, the point of sale interface 140, and the wireless network connection 135 may be in operative communication with each other via, for example, a bus or any other subsystem that may transfer data between components in the wireless payment system 130.

The wireless network interface 135 may include any suitable wireless network interface such as a wireless receiver, transmitter, or transceiver that may be used to connect the wireless payment system 130 to an external communication network such as the wireless network 120. The wireless network interface 135 may broadcast messages that may include purchase information such as a description of goods and/or services being purchased, a purchase or order identifier, or the like to the wireless network 120. The wireless network interface 135 may also receive messages including payment information from the wireless network 120.

The processor 150 may include may include a standardized processor, a specialized processor, a microprocessor, or the like that may fetch, decode, and/or execute computing applications and/or computer readable instructions. The processor 150 may fetch, decode, and/or execute computer readable instructions to generate messages that may include information such as a purchase total, payment information including an account identifier, a system configuration, or the like between the first and second electronic devices 105, 115 and the point of sale terminal 160. For example, the processor 150 may generate a message including information associated with a purchase being initiated and may broadcast the message to the first and second electronic devices 105, 115. The processor 150 may also receive a selection of a purchase associated with the broadcasted message, or other suitable indication from the first and second electronic devices 105, 115, may receive payment instructions or information from the first and second electronic devices 105, 115, and may provide the payment instructions or information to the point of sale terminal 160 such that a payment transaction may be completed.

The storage component 145 may include any combination of storage components such as databases, storage drives, registers, cache, random access memory (RAM) memory chips, read only memory (ROM) memory chips, Flash memory, or the like. The storage component 145 may store computer executable instructions that may be fetched and executed by the processor 150. For example, the storage component 145 may store computer executable instructions that may cause the processor 150 to generate a message that may include information associated with one or more purchases initiated with the point of sale terminal 160 and broadcast the generated message to the wireless network 120 using the wireless network interface 135.

As shown in FIG. 1, the wireless payment system 130 may further be in communication with a point of sale terminal 160. The point of sale terminal 160 may be a cash register, a computer, or any other suitable electronic device that may be used to initiate payment for goods and/or services that may be provided by a merchant and purchased by a purchaser such as the first and second purchasers 100, 110.

The point of sale terminal 160 may be operated by mer- chant representative (not shown). The merchant representative may be a cashier, a customer service representative, or the like, at a place of business of the merchant. For example, a merchant representative or cashier may interact with the point of sale terminal 160 to scan a Universal Product Code (UPC) assigned to goods and/or services offered by a merchant, enter information such as a serial number or Stock Keeping Unit (SKU) identifier associated with goods and/or services offered by a merchant, and calculate a total price of goods and/or services being purchased by a purchaser.

Alternatively, the point of sale terminal 160 may be operated by the first and second purchasers 100, 110. For example, the point of sale terminal 160 may be a self-checkout terminal or case register such that the first and second purchasers 100, 110 may interact with the point of sale terminal 160 to scan the UPC assigned to goods and/or services offered by a merchant, enter information such as the serial number or the SKU identifier associated with goods and/or services offered by a merchant, and calculate a total price of goods and/or services being purchased by a purchaser.

As shown in FIG. 1, the wireless payment system 130 may be a separate component that acts as an intermediary between the first and second electronic devices 105, 115 operated by the respective first and second purchasers 100, 110 and the point of sale terminal 160 that may be operated by a merchant. For example, as described above, the wireless payment system 130 may include a point of sale interface 140. The point of sale interface 140 may be a serial port, such as an RS-232 interface, an Ethernet connection, a FireWire interface, a Universal Serial Bus (USB) interface, a wireless interface, or any other suitable interface that may enable communication between the wireless payment system 130 and the point of sale terminal 160, such that information including purchase totals, purchase identifiers, or payment information, such as account numbers, expiration dates, or the like, may be transferred therebetween via a point of sale communication link.

The wireless payment system 130 may also be a component integrated into the point of sale terminal 160. For example, the wireless payment system 130 may be a component embedded or inserted into the point of sale terminal 160.

The point of sale terminal 160 may be in communication with a payment processor 170. The payment processor 170 may be any suitable entity that may arrange for the settlement of the purchase amount from an account associated with the first or second purchaser 100, 110 to an account associated with the merchant for the goods and/or services purchased. The account may be identified in, for example, the account information received via a payment instruction message from the first or second electronic devices 105, 115.

As described above, a merchant representative or the first and second purchasers 100, 110 may interact with the point of sale terminal 160 to scan a Universal Product Code (UPC) associated with goods and/or services being purchased or enter a serial number or Stock Keeping Unit (SKU) identifier associated with goods and/or services being purchased. After the UPC, serial number, or SKU identifier for each good or service being purchased by a purchaser such as the first and second purchasers 100, 110 may be scanned or entered, a purchase amount may be calculated by the point of sale terminal 160. A purchase message may then be transmitted by the point of sale terminal 160 to the wireless payment system 130. The purchase message may include the purchase amount, an identifier of a sales representative, an identifier associated with the point of sale terminal 160, a description of the good or services being purchase, an identifier of a bill associated with the goods or services being purchased, a location such as a table identifier where goods and/or services may have been received, or any other suitable information associated with goods and/or services being purchased.

The wireless payment system 130 may receive the purchase message from the point of sale terminal 160 via the point of sale interface 140. The wireless payment system 130 may then process the purchase message. For example, the processor 150 may decode the payment message including the information therein and generate a payment request message. The payment request message may include information included in the purchase message as well as additional information such as configuration details including information regarding how to conduct a payment transaction or settlement transaction with the wireless payment system 130 and/or the payment processor 170.

After generating the payment request message, the wireless payment system 130 may broadcast the payment request message to the wireless network 120. For example, the processor 150 may provide the payment request message to the wireless network interface 135 such that the wireless network interface 135 may broadcast the payment request message to the wireless network 120 using, for example, a multicast Domain Name System (DNS) or any other suitable communication protocol.

The first and second electronic devices 105, 115 may receive the payment request message via the wireless network 120. For example, the first and second electronic devices 105, 115 may connect to the wireless network 120 when the first and second purchasers 100, 110 enter a store associated with the merchant or when the first and second purchasers 100, 110 are within a suitable range of the wireless network 120 at the store of the merchant. The first and second electronic devices 105, 115 may include a wireless connection mode such that the first and second electronic devices 105, 115 may be automatically connected to the wireless network 120 when the first and second purchasers 100, 110 enter the store of the merchant or are within a suitable range of the wireless network 120 at the store of the merchant.

The first and second electronic devices 105, 115 may provide a visual indication of the information in the payment request message received from the wireless network 120 to the first and second purchasers 100, 110. For example, the first and second electronic devices 105, 115 may display an interface that includes the information in the payment request message. The first and second electronic devices 105, 115 may also provide an indication that the source of the payment request message such as the wireless payment system 130 is a trusted entity.

The first and second purchasers 100, 110 may interact with the interface to select or approve one or more orders associated with the goods and/or services purchased via the point of sale terminal 160. The first and second purchasers 100, 110 may also interact with the interface to initiate a payment instruction message for a selected or approved order. The payment instruction message may include payment transaction information. The payment transaction information may include account information such as an account identifier or other funding source to provide payment of the purchase amount of the goods and/or service as well as additional information entered by the first and second purchasers 100, 110, such as a tip amount, a selection of an extended warranty, information included in the payment request message, or the like. The payment instruction message may be broadcast or transmitted to the wireless payment system 130 via the wireless network 120 upon a final review, negotiation, and/or submission by the first and second purchasers 100, 110 interacting with, for example, the interface. The payment instruction message may be encrypted before being broadcast or transmitted to the wireless payment system 130.

The wireless payment system 130 may then receive the payment instruction message via the wireless network 120. Upon receipt of the payment instruction message, the wireless payment system 130 may further verify the integrity of the payment instruction message and may enable a security safeguard such as encryption/decryption for the payment instruction message. The wireless payment system 130 may receive the payment instruction via, for example, the wireless network interface 135. The wireless payment system 130 may then process the payment instruction message using, for example, the processor 150, such that the wireless payment system 130 may provide the payment transaction information associated with the payment instruction message to the point of sale terminal 160 via, for example, the point of sale interface 140.

The payment transaction information may be provided to the point of sale terminal 160 via the point of sale interface 140 using the point of sale communication link The point of sale communication link may include a simulated magnetic stripe read, an RFID credit card transaction, or the like. The payment transaction information may also be provided to the point of sale terminal 160 via the point of sale interface using a communication protocol, an Application Programming Interface (API), or any other suitable interface to transfer information between the wireless payment system 130 and the point of sale terminal 160.

The point of sale terminal 160 may receive and process the payment transaction information by providing the payment transaction information to the payment processor 170. As described above, the payment processor 170 may arrange for the settlement of the purchase amount from an account associated with the first or second purchaser 100, 110 to an account associated with the merchant for the goods and/or services purchased. The purchase amount and the account may be identified in, for example, the payment transaction information provided by the point of sale terminal 160.

The point of sale terminal 160 and/or the wireless payment system 130 may then provide a confirmation of payment, such as an electronic receipt, to the first and second electronic devices 105, 115.

Figure 2:
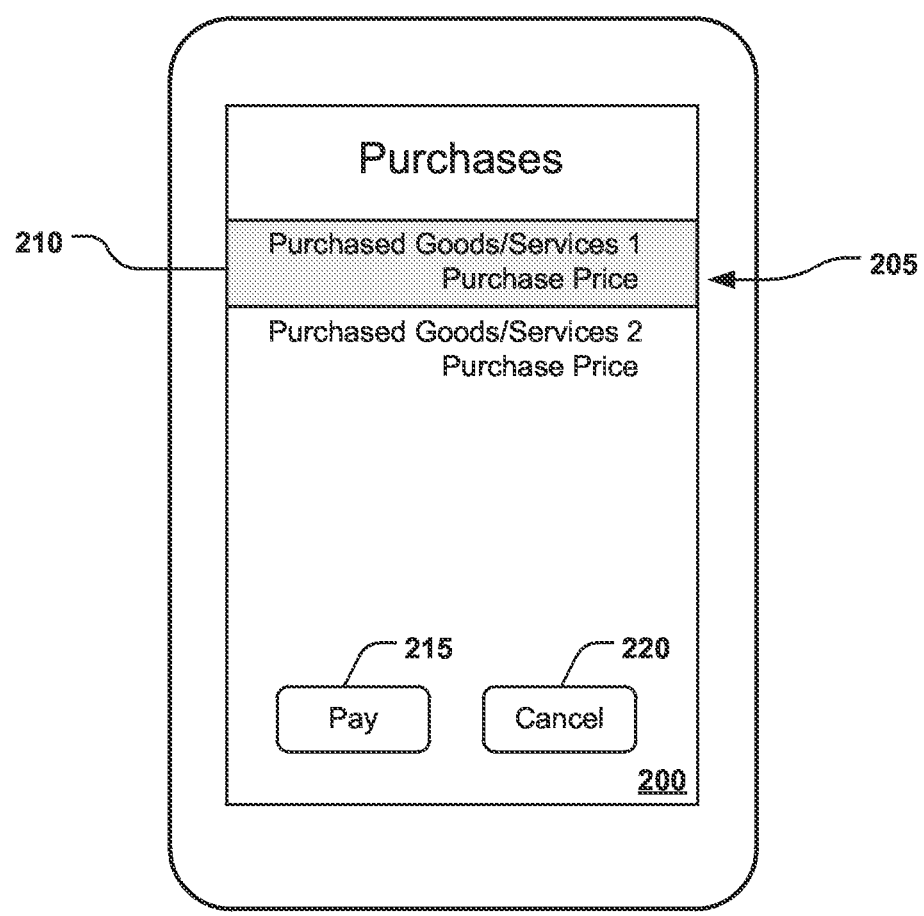
FIG. 2 depicts an example embodiment of a user interface that may be provided to an electronic device to initiate payment for goods and/or services.

FIG. 2 depicts an example embodiment of a user interface 200 for initiating a payment transaction for goods and/or services. As described above, an electronic device, such as the first and second electronic devices 105, 115 described above with respect to FIG. 1, may display an interface that includes information in the payment request message. The interface 200 may be a Web page generated using, for example, HTML, Java, or the like, an application user interface, or any other suitable interface that may provide an indication of purchased goods and/or services.

The interface 200 may include an indication of goods and/or services associated with an order that may have been initiated by the merchant representative or a purchaser such as the first and second purchasers 100, 110 using a point of sale terminal, such as the point of sale terminal 160 described above with respect to FIG. 1. For example, the point of sale terminal may provide a purchase message to a wireless payment system such as the wireless payment system 130. The purchase message may include the purchase amount, an identifier of a sales representative, an identifier associated with the point of sale terminal, a description of the good or services being purchase, an identifier of a bill associated with the goods or services being purchased, a location such as a table identifier where goods and/or services may have been received, or any other suitable information associated with goods and/or services being purchased. The wireless payment system may receive the purchase message, process the purchase message, and generate a payment request message. The payment request message may include information included in the purchase message as well as additional information such as configuration details of the point of sale terminal and/or the wireless payment system.

The interface 200 may include the information in one or more payment request messages broadcasted by the wireless payment system. For example, as shown in FIG. 2, the interface 200 may include a purchased good and/or services list 205 that includes information provided by one or more payment request messages associated with orders for goods and/or services placed via, for example, the point of sale terminal.

The purchaser may interact with the interface 200 to select or approve one or more orders associated with the goods and/or services purchased via the point of sale terminal. For example, the purchaser may select a first order 210 associated with goods and/or services purchased. The purchaser may select the first order 210 by highlighting the first order 210 in the purchased goods and/or services list 205 using an input device provided by the electronic device.

The purchaser may further interact with the interface 200 to initiate a payment instruction message for the selected first order 210. For example, the interface 200 may include a pay option 215. The pay option 215 may include a button, hyperlink, or the like that may be selected or clicked to generate and/or provide a payment instruction message for the selected first order 210 to the wireless payment system or to be directed to additional interfaces.

For example, the payment instruction message may be generated and/or provided to the wireless system upon clicking the pay option 215. As described above, the payment instruction message may include payment transaction information that includes account information such as an account identifier or number to use to purchase the goods and/or services associated with the selected first order 210. The account information may be preselected by the purchaser and, for example, stored on the electronic device such that the payment instruction message may be automatically generated and provided to the wireless payment system upon selection of the pay option 215.

Alternatively, the purchaser may be directed to one or more additional interfaces (not shown) upon selecting or clicking the pay option 215. The purchaser may then interact with the one or more additional interfaces (not shown) to enter account information or other information such as a confirmation number to confirm that the purchaser purchased the goods and/or services associated with the selected first order 210. Upon entering such information, the payment instruction message may then be generated for the selected first order 210 and provided to the wireless payment system.

Additionally, the purchaser may interact with the interface 200 to cancel or refuse an order that may not be associated with his or her purchased good and/or services. For example, the interface 200 may include a cancel option 220. The cancel option 210 may include a button, hyperlink, or the like that may be selected or clicked to refuse an order not corresponding to an order for goods and/or services placed by the purchaser. To cancel or refuse an order, the purchaser may select one of the orders in the purchased goods and/or services list 205 as described above and may then click or select the cancel option 220.

Figure 3:
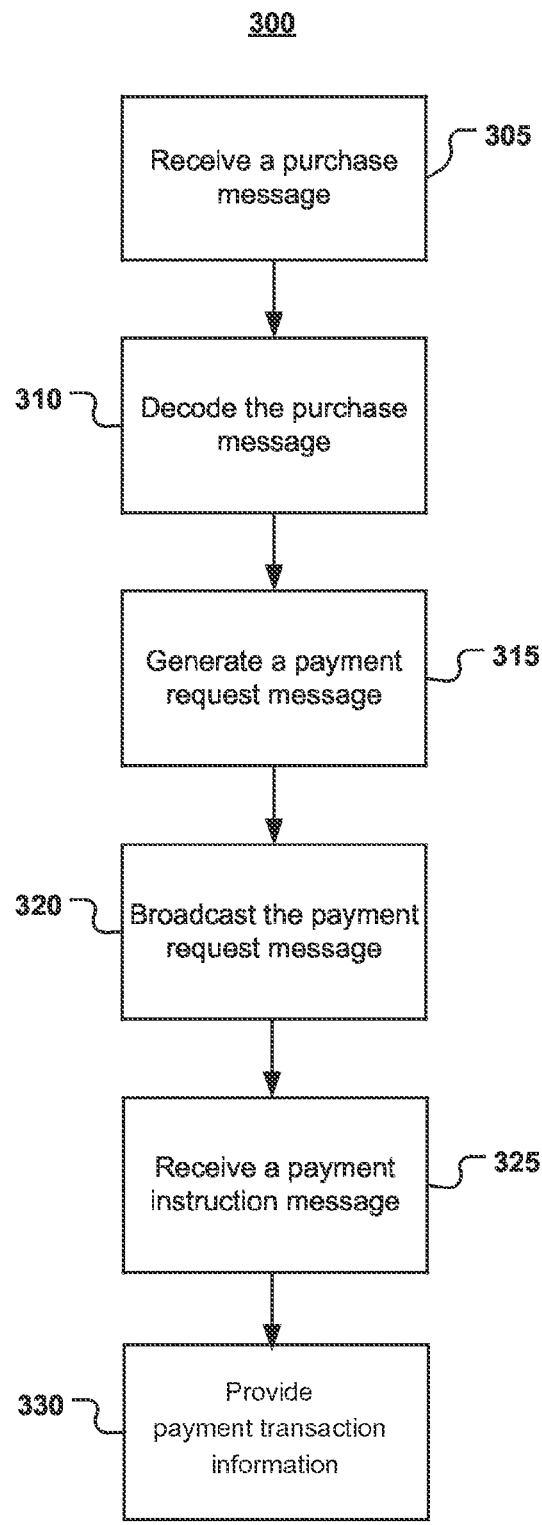
FIGS. 3-4 depict flow diagrams of example methods for initiating an electronic payment for goods and/or services.

FIG. 3 depicts a flow diagram of an example method 300 for initiating an electronic payment for goods and/or services associated with an order. As shown in FIG. 3, at 305, a purchase message associated with an order for goods or services provided by a merchant may be received. For example, a wireless payment system such as the wireless payment system 130 described above with respect to FIG. 1 may receive the purchase message from a point of sale terminal or components associated with a point of sale terminal. The purchase message may include information such as a purchase amount, a merchant identifier, a sales representative identifier, a description of the goods or services being purchased; a bill identifier, and/or location information.

At 310, the purchase message may be decoded. For example, the wireless payment system may decode the purchase message to extract information that may be included therein.

At 315, a payment request message may be generated based on the decoded purchase message. For example, the wireless payment system may generate a payment request message based on the information included in the decoded purchase message. The payment request message may include a purchase amount, a merchant identifier, a sales representative identifier, a description of the goods or services being purchased, a bill identifier, location information, and/or configuration information.

The payment request message may then be broadcast to a network at 320. For example, the wireless payment system may broadcast the payment request message to a network such as the wireless network 120 described above with respect to FIG. 1 using a multicast Domain Name System (DNS) or any other suitable communication protocol.

After the payment request message may be broadcast at 320, a payment instruction message for the order may be received at 325. For example, an electronic device such as the electronic devices 105, 115 described above with respect to FIG. 1 may receive the broadcasted payment request message. A purchaser such as the purchasers 100, 110 may then interact with the electronic device to approve the order associated with the payment request message. In response to approving the order, a payment instruction message may be generated by the electronic device. As described above, the payment instruction message may include an identifier of the order, information included in the payment request message, a confirmation number associated with the order, and payment transaction information. The electronic device may broadcast or transmit the generated payment instruction message to the network. The wireless payment system may then receive the payment instruction message from the network at 325. Upon receipt of the payment instruction message at 325, the wireless payment system may further verify an integrity of the payment instruction message and/or may process the payment instruction message based on a security safeguard as described above.

At 330, the payment transaction information may further be provided to a payment processor to settle payment for the order. For example, as described above, the wireless payment system may provide the payment transaction information included in the payment instruction message to, for example, a payment processor such as the payment processor 170 described above with respect to FIG. 1 to transfer the funds from the purchaser to the merchant.

Figure 4:
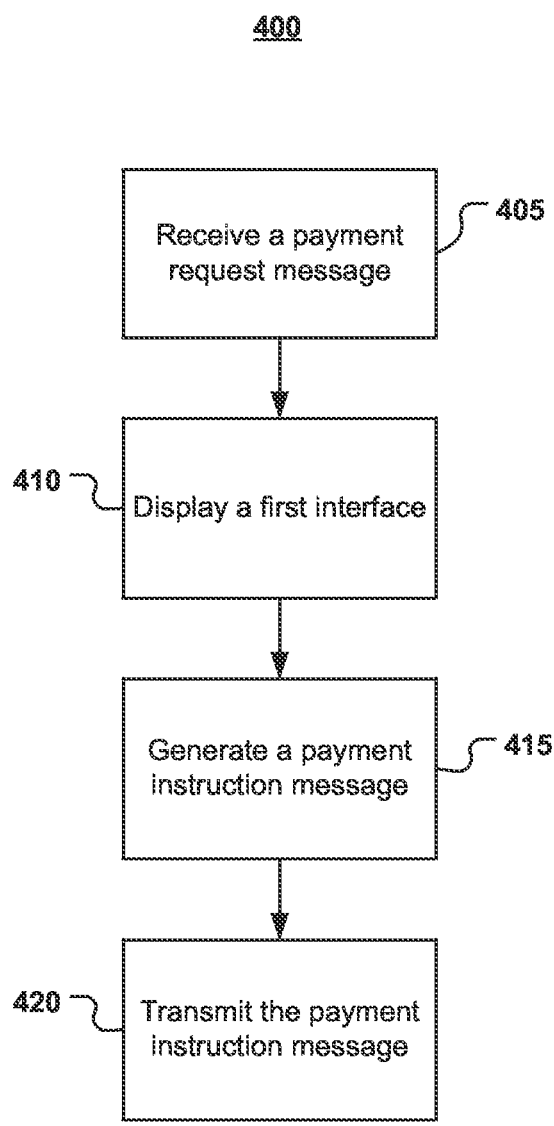

FIG. 4 depicts a flow diagram of an example method 400 for initiating an electronic payment for goods and/or services associated with an order. As shown in FIG. 4, at 405, a payment request message may be received from a network such as the wireless network 120 described above with respect to FIG. 1. For example, as described above, an electronic device such as the electronic devices 105, 115 may receive a payment request message based on an order placed with a merchant. According to one embodiment, the electronic device may include an application executing thereon that may receive the payment request message.

At 410, a first interface may be displayed. For example, the electronic device may display a first interface that may include information associated with the received payment request message and a payment option. Additionally, the first interface may include an indication that a source such as the wireless payment system or point of sale terminal of the received payment request message is a trusted entity. According to one embodiment, the application may render the first interface such that the first interface may be displayed on the electronic device.

At 415, a payment instruction message may be generated in response to a selection of the payment option. For example, upon clicking the payment option, a payment instruction massage that may include an identifier of the order, a confirmation number associated with the order, account information associated with an account being used to pay for the order, information or a portion of the information included in the payment request message, a tip amount, a purchase amount, and extended warranty information may be generated. According to one embodiment, the payment instruction may be encrypted. For example, the application and/or the electronic device may encrypt the information associated with the payment request message using one or more encryption algorithms.

According to one embodiment, the payment instruction message may be automatically generated based on account information associated with an account preselected to pay for the order. For example, an account may be preselected by a purchaser to pay for goods and/or services and account information associated with the preselected account may be stored in the electronic device. In response to the selection of the payment option, the payment instruction message may be automatically generated based on the account information for the preselected account as described above.

Alternatively, in response to the selection of the payment option, a second interface that includes one or more fields for account information associated with an account that may be used to pay for the order may be displayed. A purchaser may then interact with the second interface to enter the account information associated with an account he or she wishes to use to pay for the goods and/or services such that the account information may be received via the second interface. The payment instruction message may then be generated based on the account information received via the second interface.

At 420, the generated payment request message may be transmitted to the network. For example, the electronic device may transmit or broadcast the generated payment request message to the network using a multicast Domain Name System (DNS) or any other suitable communication protocol such that the generated payment request message may be received by the wireless payment system.

What is claimed:

1. A method for initiating an electronic payment at a store of a merchant using a wireless payment system in communication with a point of sale terminal and a portable electronic device associated with a purchaser, wherein the wireless payment system is in communication with at least the portable electronic device via a wireless network provided by the merchant at the store, and wherein the portable device is configured to automatically connect to the wireless network when the purchaser with the portable electronic device enters the store of the merchant or is within an operating range of the wireless network at the store of the merchant, the method comprising:
  receiving, at the wireless payment system, a purchase message from the point of sale terminal, the purchase message being associated with an order for goods or services provided by the merchant;
  decoding, at the wireless payment system, the purchase message;
  generating, at the wireless payment system, a payment request message for the order based on the decoded purchase message;
  broadcasting, via the wireless payment system, the payment request message to the wireless network at the merchant, wherein the broadcasted payment request message is configured to be received by the portable electronic device, via the wireless network, to initiate the electronic payment for the order using the portable electronic device;
  receiving, at the wireless payment system, a payment instruction message, via the wireless network, comprising information to electronically pay for the order, wherein the payment instruction message is configured to be received from the portable electronic device, via the wireless network, to facilitate the electronic payment of the order using the portable electronic device; and
  providing, via the wireless payment system, the information associated with the payment instruction message to the point of sale terminal, wherein the point of sale terminal is configured to settle the electronic payment for the order using the information.

2. The method of claim 1, wherein the purchase message comprises at least one of the following: a purchase amount, a merchant identifier, a sales representative identifier, a description of the goods or services being purchased, a bill identifier, or location information.

3. The method of claim 1, wherein the payment request message includes at least one of the following: a purchase amount, a merchant identifier, a sales representative identifier, a description of the goods or services being purchased, a bill identifier, location information, or configuration information.

4. The method of claim 1, further comprising:
  verifying, via the wireless payment system, an integrity of the payment instruction message; and
  processing, via the wireless payment system, the payment instruction message based on a security safeguard.

5. The method of claim 1, wherein the information included in the payment instruction message comprises at least one of the following: an identifier of the order, a confirmation number associated with the order, or payment transaction information.

6. The method of claim 5, wherein the payment transaction information comprises account information associated with an account being used by the purchaser to pay for the order.

7. The method of claim 6, wherein providing, via the wireless payment system, the information associated with the payment instruction message to the point of sale terminal, wherein the point of sale terminal is configured to settle the electronic payment for the order using the information comprises providing the payment transaction information including the account information to the point of sale terminal.

8. A system for initiating an electronic payment, the system comprising:
  a point of sale interface configured to receive a purchase message associated with an order from a point of sale terminal of a merchant and to settle the electronic payment for the order using information associated with a payment instruction message;

a processor communicatively coupled to the point of sale interface, the processor configured to generate a payment request message based on information included in the received purchase message and to provide the information associated with the payment instruction message to the point of sale terminal ; and a network interface communicatively coupled to the processor, the network interface configured to transmit the generated payment request message to a wireless network provided by the merchant at a store, wherein the transmitted, generated payment request message is configured to be wirelessly received by a portable electronic device, via the wireless network, to initiate a wireless payment using the portable electronic device, and wherein the portable device is configured to automatically connect to the wireless network when the purchaser with the portable electronic device enters the store of the merchant or is within an operating range of the wireless network at the store of the merchant, and the network interface further configured to receive the payment instruction message, via the wireless network, comprising the information to electronically pay for the order, wherein the payment instruction message is configured to be received from the portable electronic device, via the wireless network, to facilitate the electronic payment of the order using the portable electronic device.

9. The system of claim 8, wherein the purchase message comprises at least one of the following: a purchase amount, a merchant identifier, a sales representative identifier, a description of goods or services being purchased; a bill identifier, a point of sale terminal identifier, or location information.

10. The system of claim 8, wherein the payment request message includes at least one of the following: a purchase amount, a merchant identifier, a sales representative identifier, a description of goods or services being purchased; a bill identifier, a point of sale terminal identifier, location information, or configuration information.

11. The system of claim 8, wherein the processor is further configured to verify an integrity of the payment instruction message; and process the payment instruction message based on a security safeguard.

12. The system of claim 8, wherein the information comprises payment transaction information, and wherein the payment transaction information comprises account information associated with an account being used by the purchaser to pay for the order.

13. The method of claim 1, wherein at least one of the following: the wireless payment system or the portable electronic device is configured to be connected to the wireless network without a network address being previously configured to establish communication between the wireless payment system and the portable electronic device via the wireless network.

14. A method for initiating an electronic payment at a store of a merchant using a wireless payment system in communication with a point of sale terminal and a portable electronic device associated with a purchaser, wherein the wireless payment system is in communication with at least the portable electronic device via a wireless network provided by the merchant at the store, and wherein the portable device is configured to automatically connect to the wireless network when the purchaser with the portable electronic device enters the store of the merchant or is within an operating range of the wireless network at the store of the merchant, the method comprising:

receiving, at the wireless payment system, a purchase message from the point of sale terminal, the purchase message being associated with an order for goods or services provided by the merchant;

generating, at the wireless payment system, a payment request message for the order based on the purchase message;

broadcasting, via the wireless payment system, the payment request message to the wireless network at the merchant, wherein the broadcasted payment request message is configured to be received by the portable electronic device, via the wireless network to initiate the electronic payment for the order using the portable electronic device;

receiving, at the wireless payment system, a payment instruction message, via the wireless network, comprising information to electronically pay for the order, wherein the payment instruction message is configured to be received from the electronic device, via the wireless network, to facilitate the electronic payment of the order using the electronic device; and providing, via the wireless payment system, the information associated with the payment instruction message to the point of sale terminal, wherein the point of sale terminal is configured to settle the electronic payment for the order using the information.

15. The method of claim 14, wherein the purchase message comprises at least one of the following: a purchase amount, a merchant identifier, a sales representative identifier, a description of the goods or services being purchased, a bill identifier, or location information.

16. The method of claim 14, wherein the payment request message includes at least one of the following: a purchase amount, a merchant identifier, a sales representative identifier, a description of the goods or services being purchased, a bill identifier, location information, or configuration information.

17. The method of claim 14, further comprising:
verifying, via the wireless payment system, an integrity of the payment instruction message; and
processing, via the wireless payment system, the payment instruction message based on a security safeguard.

18. The method of claim 14, wherein the information included in the payment instruction message comprises at least one of the following: an identifier of the order, a confirmation number associated with the order, or payment transaction information comprising account information associated with an account being used by the purchaser to pay for the order.

19. The method of claim 18, wherein providing, via the wireless payment system, the information associated with the payment instruction message to the point of sale terminal, wherein the point of sale terminal is configured to settle the electronic payment for the order using the information comprises providing the payment transaction information including the account information to the point of sale terminal.

20. The method of claim 14, wherein at least one of the following: the wireless payment system or the portable electronic device is configured to be connected to the wireless network without a network address being previously configured to establish communication between the wireless payment system and the portable electronic device via the wireless network.

* * * * *